United States Patent Office

3,159,673
Patented Dec. 1, 1964

3,159,673
SEPARATION OF 2,3,6-TRICHLOROBENZOIC ACID FROM A MIXTURE OF TRICHLOROBENZOIC ACIDS
Edward D. Weil, Lewiston, N.Y., assignor to Hooker Chemical Corporation, Niagara Falls, N.Y., a corporation of New York
No Drawing. Filed Dec. 3, 1959, Ser. No. 856,950
2 Claims. (Cl. 260—525)

This invention relates to a method for the production of a chlorobenzoic acid isomer. More specifically the concept of this invention is a new and economical method for the production of substantially pure 2,3,6-trichlorobenzoic acid.

It is apparent from the various processes discussed in the prior literature that the availability of an inexpensive process for the production of 2,3,6-trichlorobenzoic acid would be a valuable contribution to the art. Various disclosed processes related to producing 2,3,6-trichlorobenzoic acid fall far short of commercial success since the expense factors involved dictate against their use. It is well known that 2,3,6-trichlorobenzoic acid and its water soluble salts are valuable as plant growth regulators. The compounds 5-nitro- and 5-amino-2,3,6-trichlorobenzoic acids derived from the 2,3,6-trichlorobenzoic acid also have utility as selective herbicides. To warrant the use of a compound as a herbicide, in addition to being active as such, it should be among other things, economical. Unsuccessful attempts have been made to produce the pure 2,3,6-trichlorobenzoic acid isomer at a low cost; it is a primary object of this invention to provide a simple and inexpensive method for the preparation of pure 2,3,6-trichlorobenzoic acid.

It is apparent also from the prior art that it is quite difficult to obtain substantially pure 2,3,6-trichlorobenzoic acid. Disclosed in the prior art are processes resulting in mixtures of 2,3,6- and 2,4,5- or 2,3,6-, 2,4,5- and 2,3,4-trichlorobenzoic acids. These processes encompass the oxidation of the corresponding mixed trichlorotoluenes, trichlorobenzyl chlorides, trichlorobenzal chlorides, or trichlorobenzyl esters; but such processes usually result in not over sixty-five percent of the pure trichlorobenzoic acid. The literature also contains a method for the enrichment of the 2,3,6-trichlorobenzoic acid content of said mixtures wherein recrystallization from esters solvents are used. Such methods however, do not produce pure 2,3,6-trichlorobenzoic acid. These methods involve the further disadvantages of loss of a significant amount of 2,3,6-trichlorobenzoic acid which remains with the mother liquor, the requirement of a relatively expensive solvent part of which can be expected to be lost in actual manufacturing practice.

The manufacture of pure 2,3,6-trichlorobenzoic acid has been hitherto performed by the systematic but tedious and expensive methods of Brimelow et al.; J. Chem. Soc. 1951, p. 1208 (which involves the intermediate preparation of 2,3,6-trichlorotoluene or 2,3,6-trichlorobenzaldehyde). A further object of this invention therefore is to provide a simple method for preparing pure 2,3,6-trichlorobenzoic acid in high yields and without the use of costly solvents. A further advantage or object of this invention is to provide a method which yields the 2,3,6-trichlorobenzoic acid directly in the form of a water solution of a water-soluble salt, such a form being the most convenient and economic form to use 2,3,6-trichlorobenzoic acid as a plant growth regulator.

I have now unexpectedly found that 2,3,6-trichlorobenzoic acid can be isolated in high yield and purity from a mixture of 2,3,6-trichlorobenzoic acid with other trichlorobenzoic acid isomers, by adding to said mixture a quantity of an aqueous base equivalent on a molar basis to the 2,3,6-trichlorobenzoic acid present therein, said base being one which yields water soluble salts of trichlorobenzoic acids, and filtering to remove the undissolved solids. The mother liquor of such a filtration contains substantially all the 2,3,6-trichlorobenzoic acid originally in the mixture, now in solution as the salt of the chosen base, and contains almost none of other isomers except for the small traces as the free acids which have dissolved to a very small extent in the water employed. Except for these traces, the non-2,3,6-isomers remain behind as the free acids, on the filter medium.

The mother liquor containing the dissolved salt of 2,3,6-trichlorobenzoic acid can be used as such as a plant growth regulator formulation, after dilution or evaporation to a desired concentration, or the solution may be acidified with a mineral acid such as hydrochloric, nitric, or sulfuric, causing the 2,3,6-trichlorobenzoic acid to precipitate out as the free acid.

The base may be chosen from any compound which yields salts in the amount of water which it is desired to employ to dissolve the base. Suitable bases include, for example, sodium hydroxide, sodium carbonate, sodium bicarbonate, potassium hydroxide, potassium bicarbonate, potassium carbonate, lithium hydroxide, lithium bicarbonate, lithium carbonate, ammonium hydroxide, ammonium bicarbonate, dimethylamine, trimethylamine, diethanolamine, triethanolamine, triethylamine, and other alkyl-substituted amines. These amines are preferred because of the extremely high water solubility of the trichlorobenzoic acid salts thereof.

The other trichlorobenzoic acid isomers which may be present in the mixtures with 2,3,6 are the 2,4,5-, 2,3,4-, 2,3,5- and 3,4,5-isomers.

The quantity of base used in order to prepare pure 2,3,6-trichlorobenzoic acid in the highest yield should be the molar equivalent of the 2,3,6-trichlorobenzoic acid present. If less base is used, the purity of the 2,3,6-trichlorobenzoic acid will not be impaired but the yield will be reduced. On the other hand, if more than the equivalent base is used, the mother liquor will still contain all the 2,3,6-trichlorobenzoic acid but will be contaminated with the other isomers in a quantity equivalent to the excess base employed.

It is obvious from the foregoing, however, that an excess of base may be initially employed if the excess is destroyed by the addition of a strong mineral acid (such as hydrochloric or sulfuric) in a quantity equivalent to the excess base. The effect of such a modified procedure on the yield and isomeric purity of the 2,3,6-trichlorobenzoic acid is nil, but the resultant solution of the 2,3,6-trichlorobenzoic salt will be then contaminated by the salt formed by the base and mineral acid employed. As an extreme modification, the total trichlorobenzoic acid in the initial mixture may be converted to the salt of the chosen base and then the calculated amount of a strong mineral acid added so that the only base remaining unneutralized by the mineral acid is the quantity equivalent to the 2,3,6-trichlorobenzoic acid present. Such a modification will result in the contamination of the 2,3,6-trichlorobenzoic acid salt by the mineral acid salt which for some purposes is of no disadvantage.

The separation of the undissolved by-product trichlorobenzoic acid isomers from the mother liquor containing the dissolved 2,3,6-trichlorobenzoic salt is most conveniently done by filtration, although it is evident that an equivalent separation method such as centrifugation, decantation, or solvent extraction may be used without departing from the spirit of the invention which resides in the fact that the use of the equivalent amount of base puts the 2,3,6-isomer exclusively in the salt form leaving the other isomers exclusively in the acid form.

To make clearer the nature of the invention, the following examples are given but are not to be construed as limiting:

One hundred parts by weights of a mixture of sixty-one percent 2,3,6-trichlorobenzoic acid, 29 percent 2,4,5-trichlorobenzoic acid and 10 percent other isomers in the form of flakes and powder was stirred with two parts of water per part of trichlorobenzoic acid and 28.4 parts of diethanolamine (one mole per mole of 2,3,6-trichlorobenzoic acid) was added. The mixture was stirred until no more of the solid appeared to dissolve (several minutes), then cooled to five to ten degrees centigrade to repress the solubility of the free trichlorobenzoic acids in the aqueous solution, and filtered. The filter cake was washed with about one hundred parts by weight of water to displace some entrained mother liquor. The remaining solids, when dry, amounted to approximately 40 parts by weight and were found by infrared analysis to be over 70 percent 2,4,5-trichlorobenzoic acid plus small amounts of other isomers.

The combined filtrate (mother liquor) and washings comprised a solution of sixty parts of essentially pure 2,3,6-trichlorobenzoic acid in water as the diethanolammonium salt, which was shown by acidification with hydrochloric acid to pH 1, followed by cooling to zero to five degrees centigrade and filtration which yielded approximately sixty parts by weight of 2,3,6-trichlorobenzoic acid, the purity of which was shown by infrared analysis to be above 95 percent.

Similar results to the above were obtained using 12.2 parts of dimethylamine, or 16.0 parts of trimethylamine in place of the diethanolamine. Using 10.8 parts of sodium hydroxide, it was necessary to employ about one hundred parts of water to accomplish similar results because of the lesser water solubility of the sodium salts as compared with the amine salts.

The examples and methods given herein have been given for purposes of illustration only and do not restrict the invention to the specifics herein illustrated. One skilled in the art can conceive of various modifications of this invention upon a reading of this disclosure. These are intended to be comprehended within the scope of our invention.

I claim:

1. A method for the separation of substantially pure 2,3,6-trichlorobenzoic acid from a mixture of trichlorobenzoic acid isomers in which the isomers of trichlorobenzoic acid in said mixture in addition to the 2,3,6-isomer are selected from the group consisting of the 2,4,5-, 2,3,4-, 2,3,5-, and 3,4,5-isomers, which comprises treating the said mixture with an aqueous solution of a base in amount approximately stoichiometrically equivalent to the amount of 2,3,6-trichlorobenzoic acid present in the said mixture, said base being selected from the group consisting of alkali metal and ammonium salts, and lower-alkyl amines and hydroxy lower-alkyl amines, and, separating the undissolved trichlorobenzoic acids, thereby obtaining the substantially pure 2,3,6-trichlorobenzoic acid as an aqueous solution of its water soluble salt.

2. A method for the separation of substantially pure 2,3,6-trichlorobenzoic acid from a mixture of trichlorobenzoic acid isomers in which the isomers of trichlorobenzoic acid in said mixture in addition to the 2,3,6-isomer are selected from the group consisting of the 2,4,5-, 2,3,4-, 2,3,5-, and 3,4,5-isomers, which comprises treating the said mixture with an aqueous solution of a base, in amount approximately stoichiometrically equivalent to the amount of 2,3,6-trichlorobenzoic acid present in the said mixture: said base being selected from the group consisting of alkali metal and ammonium salts, and lower-alkyl amines and hydroxy lower-alkyl amines, thereby obtaining in an aqueous solution the water soluble salt of said 2,3,6-trichlorobenzoic acid; separating the undissolved trichlorobenzoic acids; and, recovering the substantially pure 2,3,6-trichlorobenzoic acid from the aqueous solution of its water soluble salt by acidification of the said salt solution with a strong mineral acid.

References Cited in the file of this patent

UNITED STATES PATENTS

| | | |
|---|---|---|
| 1,942,826 | Mills | Jan. 9, 1934 |
| 2,847,462 | Sieger | Aug. 12, 1958 |